Sept. 14, 1937. R. D. McELHANY ET AL 2,093,092
METHOD OF JOINING TUBULAR MEMBERS
Original Filed June 1, 1933 2 Sheets-Sheet 1

INVENTORS
Robert D. McElhany
Jas. Bowman
BY Conrad A. Dieterich
ATTORNEY.

Sept. 14, 1937.  R. D. McELHANY ET AL  2,093,092
METHOD OF JOINING TUBULAR MEMBERS
Original Filed June 1, 1933   2 Sheets-Sheet 2
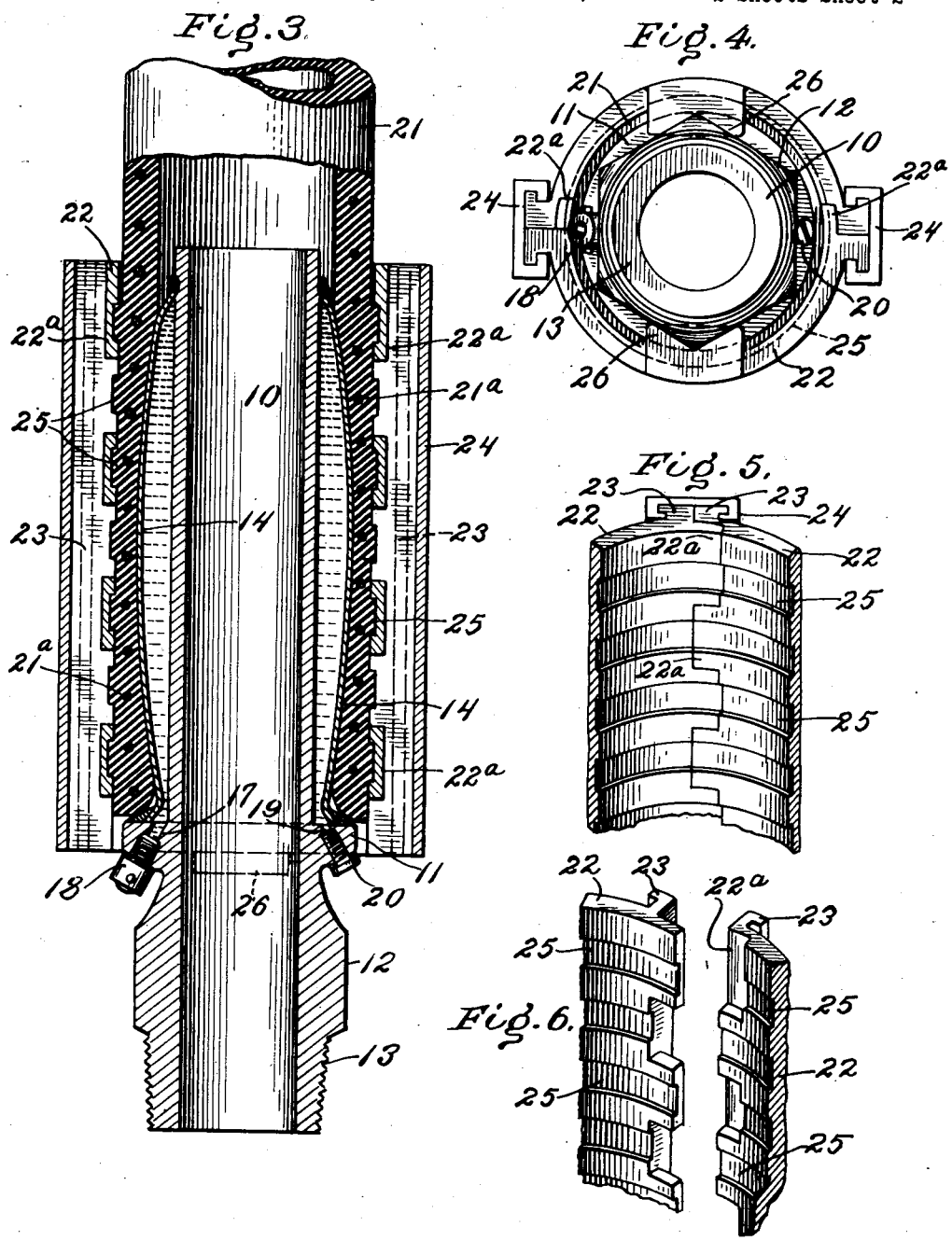

UNITED STATES PATENT OFFICE 2,093,092

METHOD OF JOINING TUBULAR MEMBERS

Robert D. McElhany and James Borrowman, Beacon, N. Y.

Original application June 1, 1933, Serial No. 673,809. Patent No. 2,015,081, dated September 24, 1935. Divided and this application September 21, 1935, Serial No. 41,522

9 Claims. (Cl. 29—88.2)

Our invention relates to improvements in connecting or joining together hose sections, pipes, or other tubular members, or for connecting the end of a hose to a nozzle or other attachment or device.

Further, said invention has for its object to provide a hose coupling which will effectively secure together adjoining ends of hose or pipe sections, or other tubular members and form a fluid-tight joint between the same.

Further, said invention has for its object to provide a hose coupling which will form a fluid tight joint between the end of the hose and the coupling member without causing the hose to become distorted or crimped.

Further, said invention has for its object to produce a hose coupling in which the end of the hose to be joined is compressed by pressure exerted outwardly against a circumferential clamp, and thereafter held to such compressed condition.

Further, said invention has for its object to provide a hose coupling in which the end of the hose is secured to and within a clamping member by means of a yielding or deformable member on a portion of the device extending into the hose end, and which latter is forced outwardly by pressure produced between said deformable member and the portion of the device extending into the hose end.

Other objects will in part be obvious and in part be pointed out hereinafter.

To the attainment of the aforesaid objects and ends our invention consists in the novel steps constituting the method hereinafter more fully described and then pointed out in the claims.

In the accompanying drawings wherein like numerals of reference indicate like parts—

Fig. 3 is a similar view showing the hose fully secured therein;

Fig. 4 is a bottom view;

Fig. 5 is a detail perspective view showing the interengaging edges of the clamping members, and Fig. 6 is a similar view showing the interengaging edges of said clamping members in separated relation.

Figure 1:
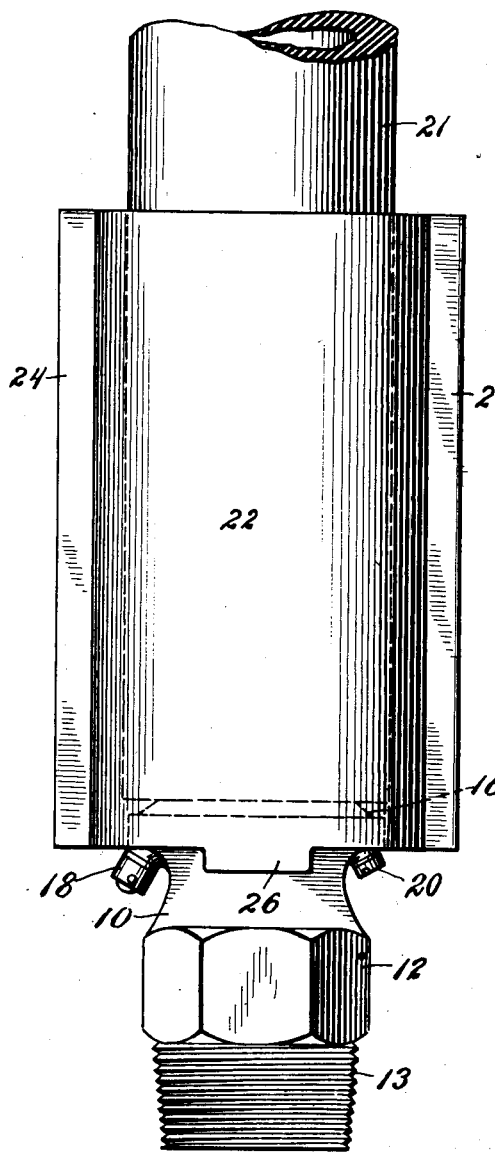
Figure 1 is a side elevation showing one form of hose coupling constructed according to, and embodying our said invention.
Figure 2:
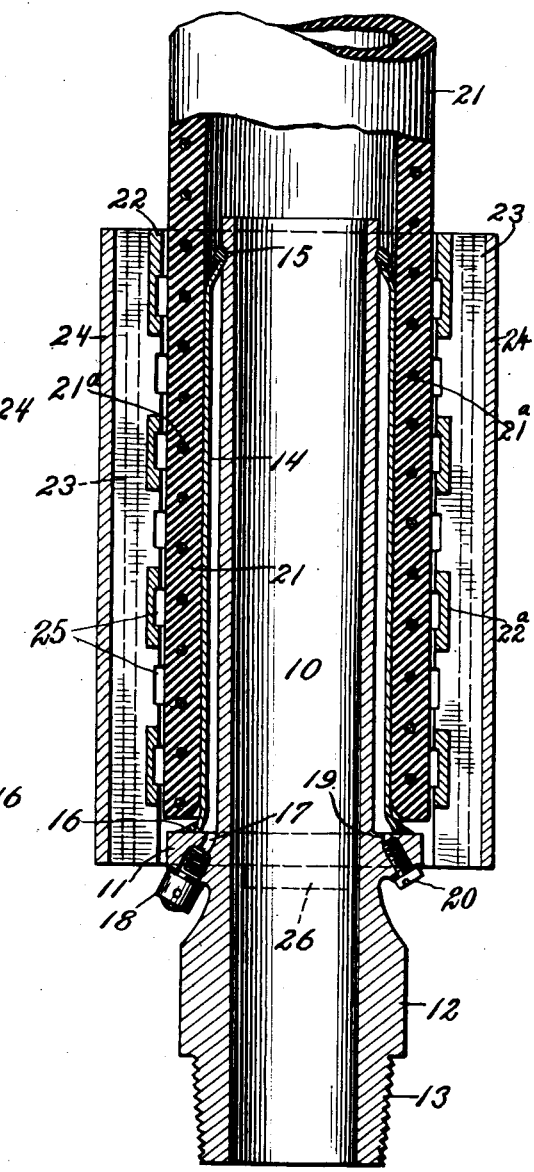
Fig. 2 is a central section showing the end of a hose in position thereon.

In the accompanying drawings 10 designates a tubular coupling member made of cast metal having an annular collar 11 adjacent to one of its ends and a nut 12 below said collar both formed integrally with said tubular coupling member. The end of said coupling member, below said nut 12, is screw threaded at 13.

14 denotes a sleeve or hollow cylindrical wall member of larger diameter than said coupling member 10 and disposed thereon with its lower end engaging the upper side of the collar 11. The sleeve or wall member 14 is preferably made of copper, soft steel or other suitable metal or alloy capable of being deformed under pressure, and of retaining its deformed shape. The upper end 15 of the sleeve 14 is turned inwardly and is seated in an annular recess in the tubular member 10, and the lower end of said sleeve 14 is flared outwardly at 16 and engages the upper side of the collar 11. Both the upper end 15 and the flared lower end 16 of said sleeve 14 are welded, brazed or otherwise secured to the tubular member 10 to form a fluid-tight connection therewith. The said parts when united serve to form an annular, double-walled receptacle at one end of said coupling member 10 adapted to receive the end of a hose.

The collar 11 is provided with a screw-threaded passage 17 adapted to receive the nozzle of a hose or pipe of a suitable force pump, not shown. The passage 17 communicates with the space between the tubular coupling member 10 and the sleeve 14, forming the hollow or double-walled end portion of the coupling, through which passage a suitable liquid such as oil or a heavy grease may be forced into said space by a pump in order to cause the wall portion 14 to become distended, as shown by full lines at Fig. 3. When the amount of liquid required to fully distend the wall member has been introduced, the passage 17 is sealed by the screw-plug 18. To permit of the escape of air while the liquid is being forced into the double-walled receptacle, the collar 11 is provided with an air vent 19 which communicates with the interior of said receptacle, and is provided with a screw plug 20 for sealing the same.

21 denotes the end of a high pressure hose which is made of heavy rubber having one or more spiral reinforcements 21ª. The said end 21 is disposed upon the tubular member 10 and closely embraces the wall-member 14 thereof.

The end of the hose is closely embraced by a clamping device comprising two semi-cylindrical members 22 having dentated, interengaging, longitudinal edges 22ª terminating in conforming longitudinally grooved ribs 23 adapted to receive sliding keys 24 in the form of channel members, which serve to hold the two clamping members 22 secured together and in contact with the outer surface of the hose end 21 without unduly compressing the same.

The inner sides of the clamping members 22 are provided with a series of semi-circular horizontal grooves 25 whose ends register with the corresponding grooves of the cooperating clamping member 22, and each clamping member 22 is provided at its lower edge with an inwardly-extending projection 26 adapted to engage with the underside of the collar 11 of the tubular member 10 to hold the parts duly in position until finally secured by the expansion of the wall member 14, as hereinafter more fully described.

To secure the end of a hose 21 to the tubular member 10, the double-walled receptacle 10ª, of the tubular member 10 is inserted into the end of the hose 21, as shown at Fig. 3, and the clamping members 22 disposed over the hose with their edges 20ª in interengaging relation, and the projection 26 engaging the collar 11 of the tubular coupling member 10. The keys 24 are then slipped into engagement with grooved ribs 23 of the clamping members 22. Hereupon the plugs 18 and 20 sealing the passages 17 and 19, respectively, in the collar 11, are removed and a pump secured in the threaded portion of the passage 17, and a suitable non-elastic fluid, preferably heavy oil or grease forced into the space between the tubular member 10 and the outer wall portion 14 thereof until said space is completely filled with said fluid, and all air forced therefrom through the air passage 19. As soon as the oil or grease appears in the passage 19 the screw plug 20 is again secured in said passage to tightly seal the same. The operation of the pump 29 is then continued, and the liquid forced under pressure into the space between the tubular wall member 10 and the distensible wall portion 14 thereof until the latter becomes distended and deformed to about the extent shown at Fig. 3, and the portion of the hose 21 between the outer side of the wall portion 14 and the inner sides of the clamping member 22 forced outwardly and pressed firmly against the inner sides of the clamping member 22, and more or less into the annular grooves thereof. Hereupon the nozzle of the pump is removed from the passage 17, and the screw plug 18 replaced and the passage 17 firmly sealed.

The wall portion 14 having become circumferentially enlarged and deformed will retain its form, and hold the portion of the hose 21 thereon firmly clamped against the inner sides of the clamping member 22, and into the grooves 25 thereof, and at the same time form a fluid-tight joint between the outer side of the wall portion 14 and the inner side of the hose end 21.

It is to be noted that while the liquid in the space between the tubular member 10 and the distensible wall portion 14 thereof serves to reinforce the latter and assist in holding said wall portion 14 to its deformed or enlarged shape, that it is not necessary to maintain said space thereafter filled with fluid since it is impossible for the distended or bulged portion of said wall portion 14 to return to or resume its initial form. The wall portion once having been distended uniformly and taken a set cannot, therefore, resume or be caused to resume its original form.

It is to be further noted that in our coupling all possibility of the end of the hose becoming buckled or crimped is avoided, as is the case where the clamping pressure is exerted upon the outer side of the hose which tends to reduce its wall thickness and increase its diameter and circumference, and as a result weaken the same where such crimping occurs, since in our construction the action is the reverse; i. e. the pressure is exerted upon the inner side of the hose, and its wall thickness reduced without increasing the external diameter or circumference thereof due to the limiting effect of the clamping members 22 unyieldingly engaging the outer side of the hose.

While we have shown our invention as applied to high pressure hose, it will, of course, be understood that the same is not limited thereto, and that the same may be used in connection with all types of tubular members or elements, such as hose, pipes or the like, and for all purposes in which a fluid-tight connection or joint is required between any two adjoining ends, parts or members.

This application is a division of our co-pending application, Serial No. 673,809, filed June 1, 1933 for Hose coupling, which resulted in Letters Patent No. 2,015,081 dated September 24, 1935.

Having thus described our said invention, what we claim and desire to secure by Letters Patent is:

1. The method of securing together the adjacent ends of two non-yielding tubular members which consists in providing one of said tubular members at one end with a deformable tubular member, inserting said end and said deformable member into one end of the other of said non-yielding tubular members, and then subjecting said deformable tubular member to fluid pressure to permanently deform said member and expand the same circumferentially into intimate engagement with the surrounding end of said other of said tubular members.

2. The method of securing together the adjacent ends of two non-yielding tubular members which consists in providing one of said tubular members at one end with a deformable tubular member, inserting said end and its deformable tubular member into one end of the other of said non-yielding tubular members, and then producing pressure within said deformable tubular member to permanently deform said member and expand the same circumferentially into intimate engagement with the surrounding end of said other of said tubular members.

3. The method of securing together the adjacent ends of two non-yielding tubular members which consists in providing one of said tubular members at one end with an annular distensible wall portion, inserting said end into one end of the other of said non-yielding tubular members, and then subjecting said distensible wall portion to fluid pressure to permanently deform said distensible wall portion and expand the same circumferentially into intimate engagement with the surrounding end of said other tubular member.

4. The method of securing together the adjacent ends of two non-yielding tubular members which consists in providing one of said tubular members at one end with an annular distensible wall portion, inserting said end into one end of the other of said non-yielding tubular members, and then producing pressure interiorly of said distensible wall portion to permanently deform said wall portion and expand the same circumferentially into intimate engagement with the surrounding end of the other of said tubular members.

5. The method of securing the end of a hose to a coupling which consists in taking a tubular member having a hollow, annular distensible wall portion, inserting the same into the end of a hose, confining the end of the hose upon said distensible portion, and then circumferentially expanding said distensible wall portion to compress the hose end between said distensible wall portion and said confining means.

6. The method of securing the end of a hose to a coupling which consists in taking a tubular member, providing the same with an annular distensible portion, inserting an end thereof into the end of a hose, disposing clamping means about said hose end, and then distending said annular portion by pressure generated therein to secure said hose end between said distensible portion and said clamping means.

7. The method of securing the end of a hose to a coupling which consists in taking a tubular member having an annular receptacle portion including a deformable wall portion, inserting said annular receptacle portion into the hose end, confining the end of said hose, and generating pressure within said receptacle and expanding the deformable wall portion thereof whereby to clamp the end of the hose between said wall portion and the means confining the hose.

8. The method of securing the end of a hose to a coupling which consists in taking a tubular member having an annular receptacle portion including a deformable wall portion, inserting said annular receptacle portion into the hose end, confining the end of said hose, introducing an inelastic liquid under pressure into said receptacle and expanding the deformable wall portion thereof whereby to clamp the end of the hose between said wall portion and the means confining the same.

9. The method of securing the end of a hose to a coupling which consists in taking a tubular member having an annular receptacle portion at one end thereof including a deformable wall portion, inserting said annular receptacle portion into the hose end, confining the end of said hose, introducing an inelastic liquid under pressure into said receptacle and expanding the deformable wall portion thereof whereby to clamp the end of the hose between said wall portion and the means confining the same, and sealing said expanded receptacle with the liquid therein.

ROBERT D. McELHANY.
JAMES BORROWMAN.